Nov. 12, 1946.  A. B. WELTY  2,410,851
GRAIN DEHYDRATOR
Filed March 27, 1944  5 Sheets-Sheet 1
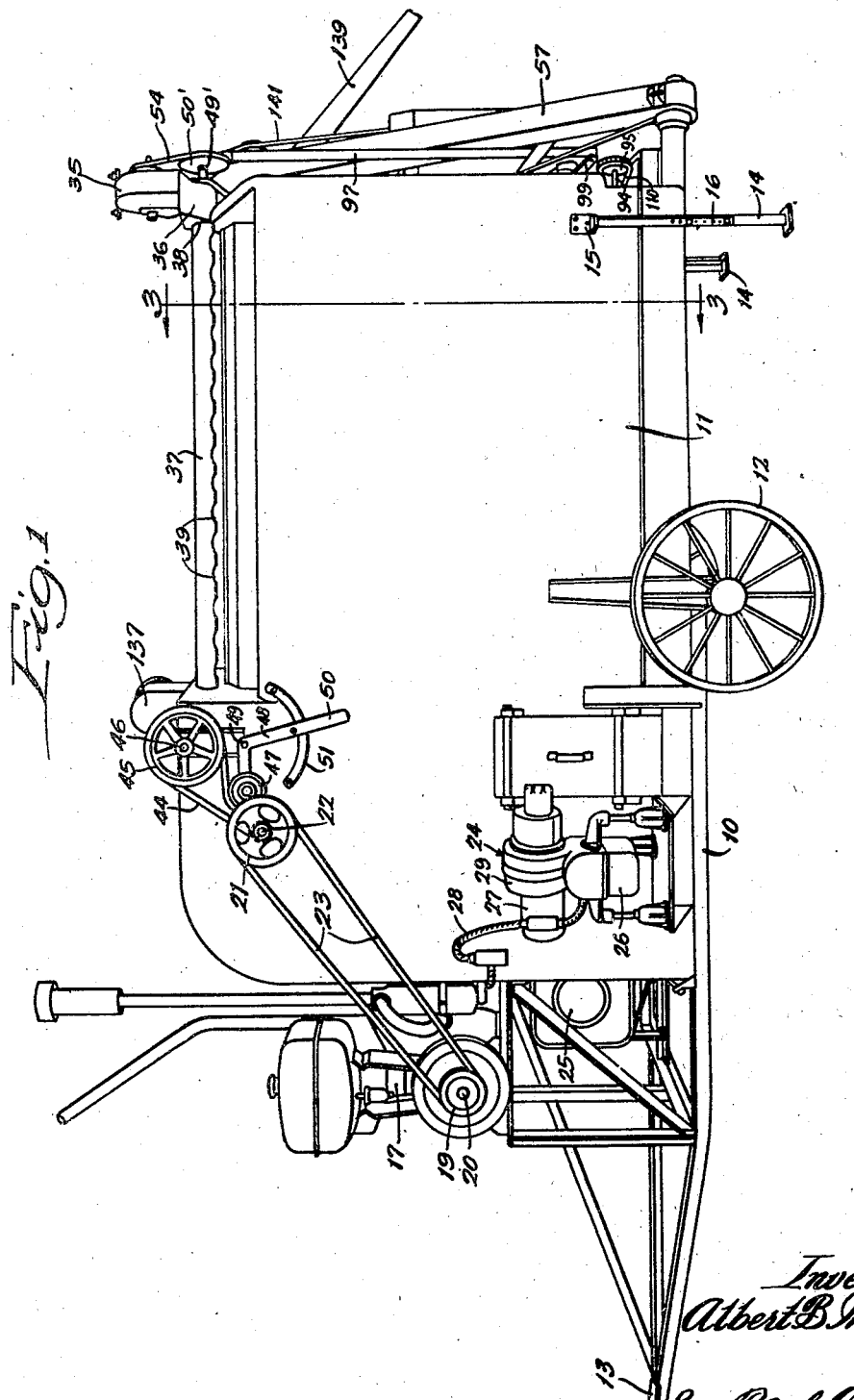
Inventor:
Albert B. Welty,
By Paul O. Pippel
Attorney.

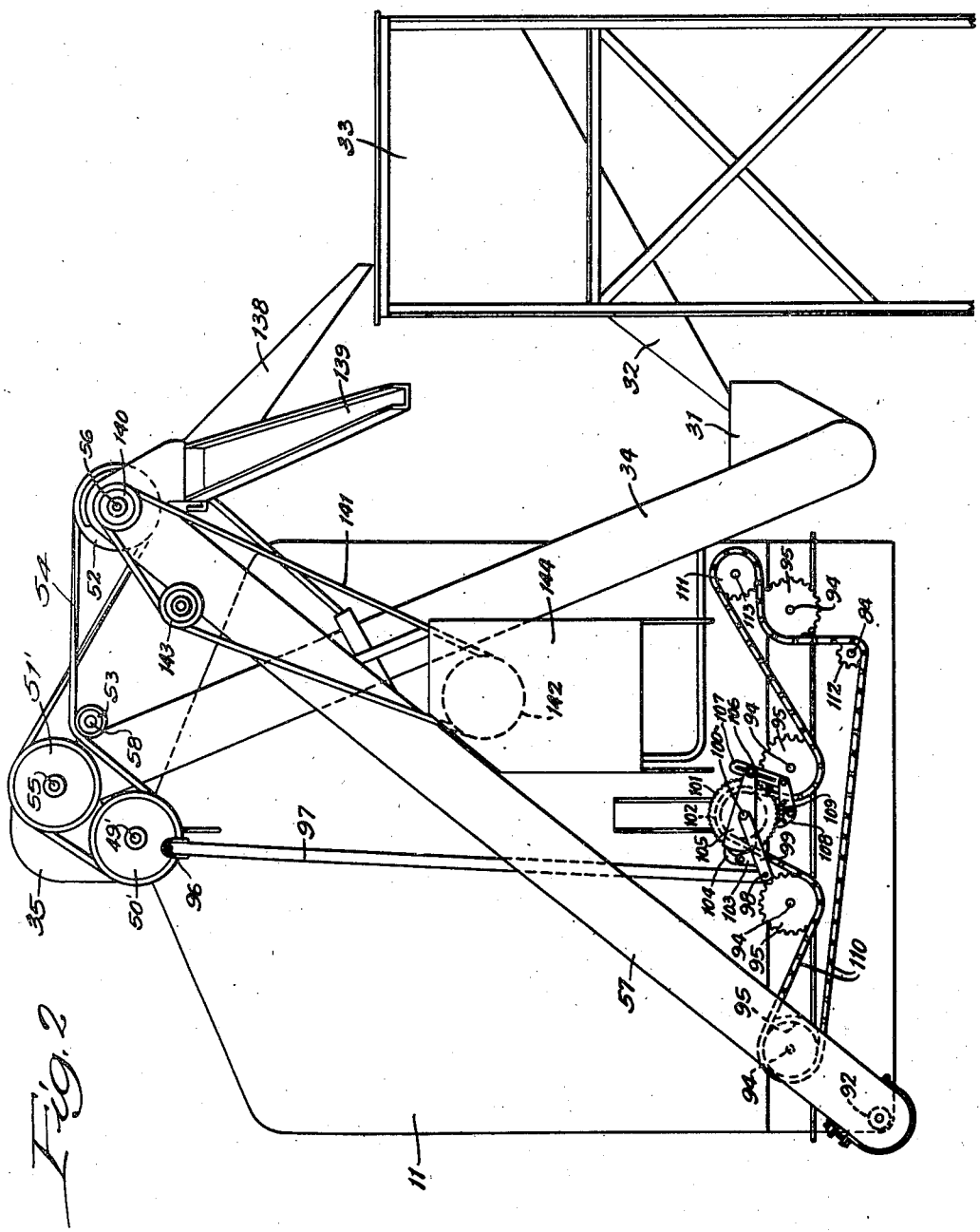

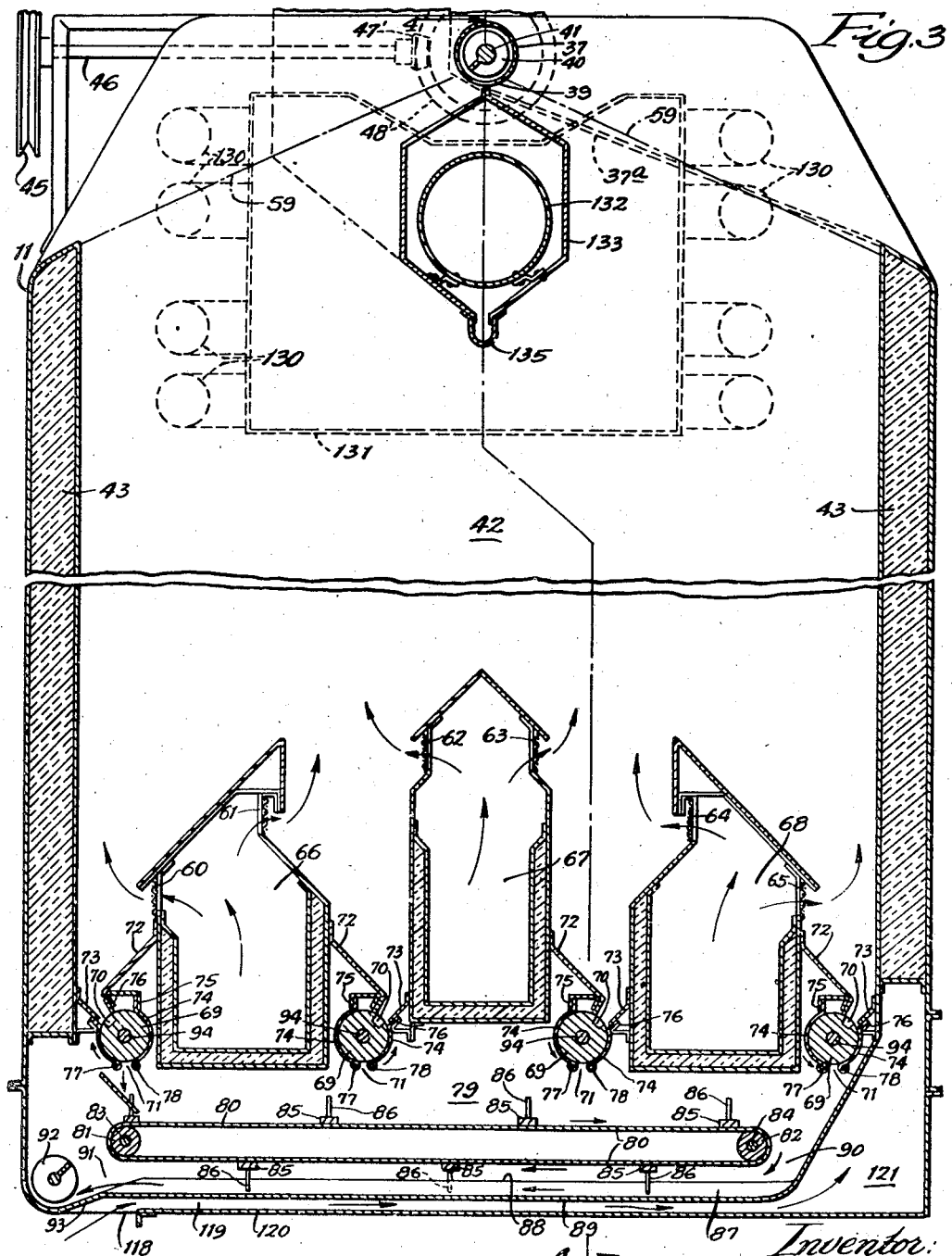

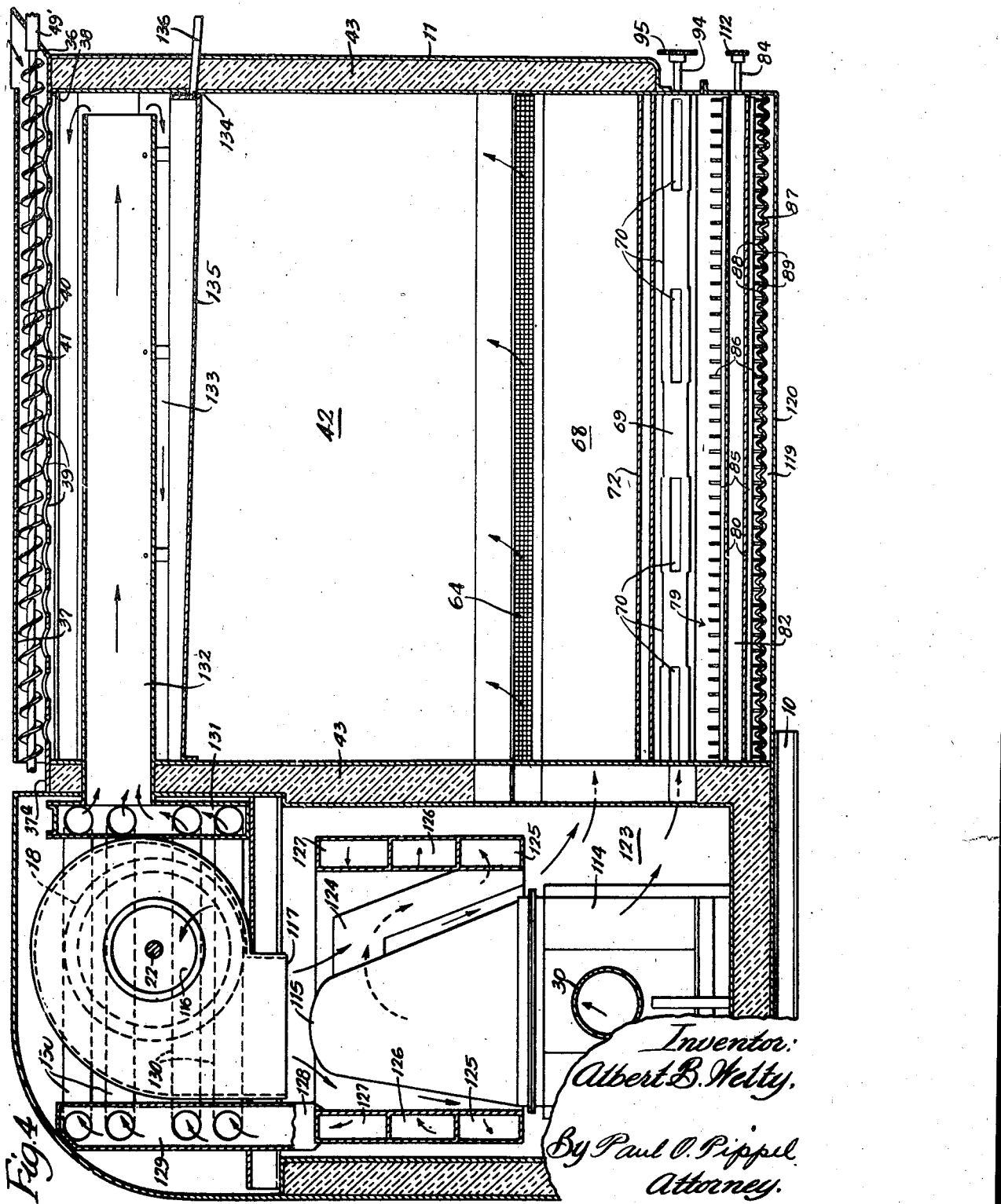

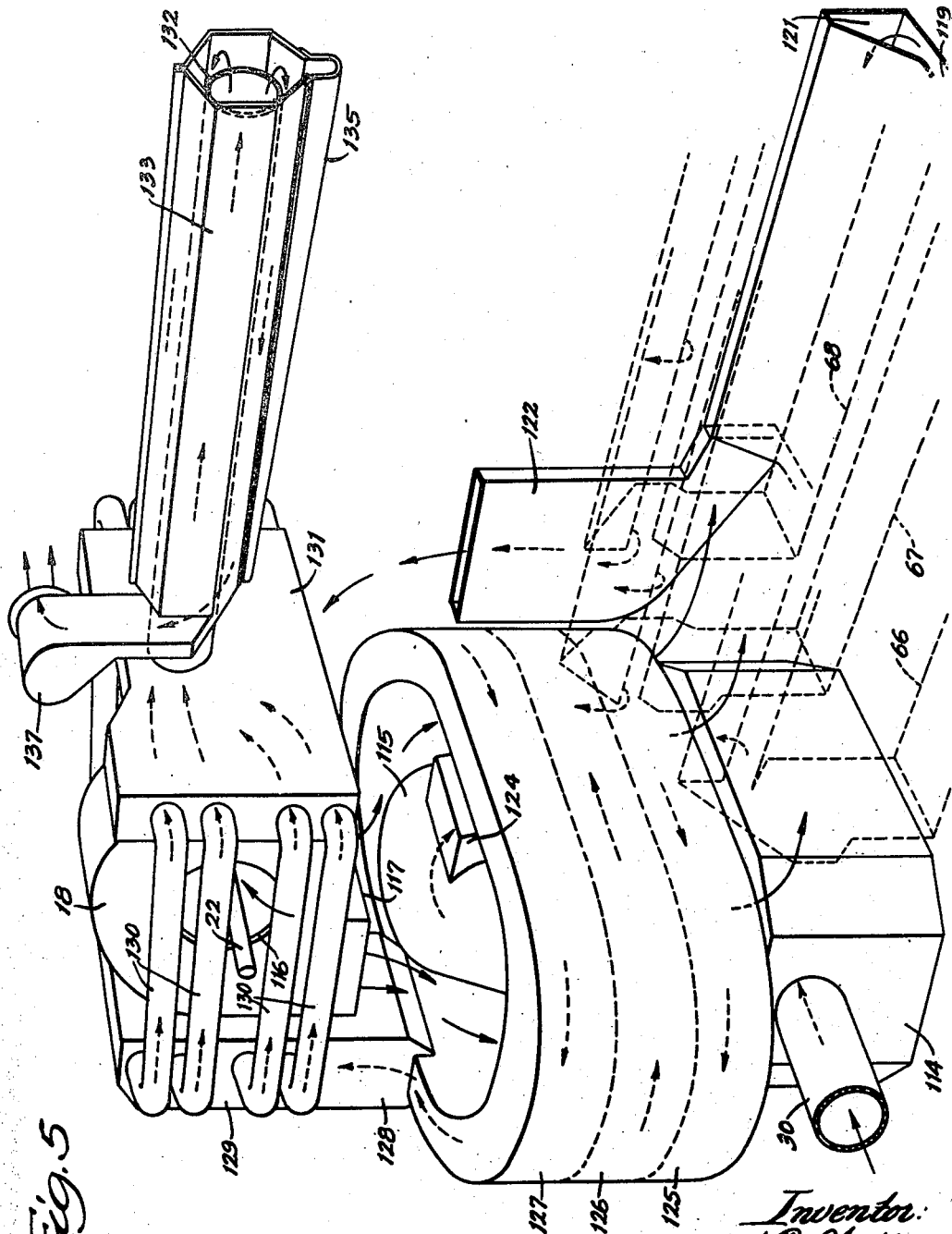

Patented Nov. 12, 1946

2,410,851

UNITED STATES PATENT OFFICE 2,410,851

GRAIN DEHYDRATOR

Albert B. Welty, Moline, Ill., assignor to International Harvester Company, a corporation of New Jersey Application March 27, 1944, Serial No. 528,254

7 Claims. (Cl. 263—19)

1

This invention relates to a new and improved grain dehydrator and has for one of its principal objects the provision of novel means for drying quantities of grain preliminary to storage.

An important object of the present invention is to provide a portable grain dryer which may be readily moved to any desired position.

Another important object of this invention is the provision of a corn dryer, wherein a quantity of corn is so treated that the greater percentage of moisture is removed therefrom.

Storing of corn without spoilage is a big problem to the individual farmer as well as to those persons operating grain elevators. When the corn is picked, the kernels usually contain a high percentage of moisture. If such corn were immediately shelled from the cobs and stored in a tight grain bin, spoilage would begin promptly. It has been found by experience that if the high moisture content of this shelled corn were reduced to 14% or less, it could be safely stored in a regular grain bin for an indefinite period of time without danger of spoilage. Heretofore, it has been impossible for an individual farmer to purchase equipment to dry shelled corn. Therefore, rather than shell the corn immediately after it has been picked, the corn would be left on the cobs and placed in open corn cribs, so that air could circulate through and cause natural drying of the corn. This process, however, required considerable time, and although there was not much danger of spoilage because the kernels were all opened to the atmosphere, losses did occur. These losses were chiefly caused by rodents or other small animals nesting in the corn bins. The danger of fire with the corn in this condition was excessive and also contributed to the losses.

Operators of grain elevators employ artificial means for driving the moisture out of corn and may therefore safely buy shelled corn which has a high moisture content. The price of high moisture corn per bushel is much less than the price of "dried" corn per bushel. It is quite advantageous to corn growers to sell their corn when it is dry rather than accept the low price for moist corn.

It is, therefore, an important object of this invention to provide an artificial means for drying corn for use by all, that is, the individual farmer, a group of farmers, or the operator of a grain elevator.

A still further important object of this invention is to provide an automatic economically operating device for drying shelled corn.

2

Other and further important objects of the present invention will become apparent from the following specification and accompanying drawings, in which:

Figure 1 is a perspective view of the portable grain dehydrator of this invention;

Figure 2 is an end view of the device as shown in Figure 1;

Figure 3 is a sectional view taken on the line 3—3 of Figure 1;

Figure 4 is a sectional view taken on the line 4—4 of Figure 3; and

Figure 5 is a skeleton perspective view of the device indicating heat circulation with arrows.

The reference numeral 10 indicates generally a chassis or frame upon which is mounted a body 11. The frame is carried by wheels 12. The forward end of the frame 10 is equipped with a hitch 13 which may be attached to and drawn by a tractor or the like. It is obvious that this grain dehydrator is portable and may be moved from bin to bin of an individual farmer, as his needs require, or may be moved to other farms for use. However, when the grain dryer is in operation, it is desired to have it remain quite stationary and to this end leg members 14 are supplied. These legs 14 are of the extension type, and although they are mounted rigidly at 15 on the body 11, they may be extended or retracted by means of an adjustment 16.

The travel of shelled corn through the grain dryer requires several mechanical devices and a plurality of elevators, and to effect an operation of these units an engine 17 is provided. One of the main functions of the engine is to drive a fan 18 as shown in Figure 4. As best shown in Figure 1, the internal combustion engine 17 imparts rotation to the pulley 19 on the crank-shaft 20. It is, of course, understood that power for the grain dryer operating units may be obtained from other means than an internal combustion engine such as an electric motor, a steam engine, or the like. A pulley 21 is mounted on the fan-shaft 22 and is operatively joined to the pulley 19 by means of a belt 23.

A heating unit, shown at 24, is provided on the frame 10 to supply the artificial heat needed to drive the moisture from the kernels of grain. The heater 24, shown here, is an oil burner type, and it is obvious that any type of furnace or heater could be employed and still secure the desired dehydration results. A fuel oil tank is shown at 25 for feeding fuel to the oil burner 26. A motor 27, preferably driven by electricity from a power-line 28, drives a pump within the housing 29.

As best shown in Figure 2, supply hopper 31 may be filled by any means such as the trough 32 shown here coming from a large receptacle 33. The hopper 31 is substantially V-shaped and is equipped with an auger lying parallel to the vertex. The auger (not shown) is adapted to feed the grain to one end of the hopper where it communicates with a supply elevator 34. The grain is then lifted to the top 35 of the elevator 34, and, as best shown in Figure 1, discharges kernels of corn into a hopper-like member 36. A pipe 37 extends longitudinally of the body 11 and is attached at one end to the hopper 36 at 38, as shown in Figure 1. In the pipe 37 is housed an auger 40 which projects within the hopper 36, as shown in Figure 4, and extends the entire length of the pipe 37. The auger 40 is equipped with a central shaft 41 which extends beyond the hopper 36 and beyond the other end of the pipe 37. As the kernels of corn are fed to the hopper 36, they are carried by the rotating auger 40 through the pipe 37. The holes 39, in the bottom of the pipe, permit the corn to drop through into the chamber 42 within the body 11. The corn will continue to drop through this successive series of holes until such time as the column formed therebeneath supplies sufficient back pressure to cause the corn to travel to the end of the pipe 37. Any surplus of corn that does reach the end of the pipe will return through the conduit 37$^a$ to the supply receptacle 31.

Referring now to Figure 1, it will be seen that a pulley (not shown) on the fan-shaft 22 drives a belt 44, which in turn drives a pulley 45 mounted on a shaft 46. An idler pulley 47 is mounted on the end of a bell-crank 48 which is pivoted at 49 and which has a handle portion 50 swingable on the arcuate member 51. In the position shown, the idler pulley 47 has so tightened the belt 44 that it effects a drive between the fan-shaft 22 and the shaft 46. However, if the handle 50 of the bell-crank 48 were swung in a rightward or counterclockwise direction, viewing the device as in Figure 1, the idler pulley 47 would be withdrawn from contact with the belt 44 and so permit rotation of the shaft 22 without resulting rotation of the shaft 46. Figure 3 shows an enlarged view of the pulley 45 and its shaft 46. From this view it is seen that a bevel pinion gear 47', keyed or otherwise fastened to the end of shaft 46, cooperates with a large bevel gear 48' which is keyed or otherwise fastened to the auger shaft 41. From this arrangement of pulleys and gears, it will be understood that the engine 17 effects a driving of the fan 18, the auger 40, in addition to supplying a continuously rotating end 49' of the auger shaft 41. This rotating end 49' is best shown in Figures 1, 2, and 4, and in Figures 1 and 2 it is evident that a pulley 50' is keyed or otherwise fastened to this rotating shaft end 49'.

Several pulleys, namely, 51', 52, and 53, are in a common plane with the pulley 50' and are joined together by means of a crossed belt 54. The pulley 51' is mounted on shaft 55 and directly drives the grain supply elevator 34. The pulley 52 is mounted on shaft 56 and imparts a drive to a grain discharge elevator 57. The pulley 53 is an idler tightener pulley and is mounted on a stub-shaft 58.

The chamber 42 is rectangular in shape and is well insulated from the atmosphere by thickly insulated walls 43 as shown in Figures 3 and 4.

Figure 3 is a cross-sectional view of the chamber 42 of the grain dryer. As the grain discharges from the pipe 37, it forms a central ridge directly beneath the pipe 37 and from there it tapers downwardly as shown by the lines 59. In operation, the chamber 42 is entirely filled with kernels of corn, and it is the object of this device to heat this column of corn in the chamber 42 and then discharge it from the bottom thereof, whereupon it is cooled and then stored. The slope of the upper surfaces of the corn as designated by the lines 59 is substantially parallel with lines drawn through the heat entrances. The heat entrances, as shown at 60, 61, 62, 63, 64, and 65, are in the upper portions of three plenum chambers 66, 67, and 68. These three plenum chambers are maintained with a supply of hot air. The heat entrances 60, 61, and 62 are in a line substantially parallel with the inclined surface 59 directly above, and similarly, the heat entrances 63, 64, and 65 are substantially parallel with the corn surface line directly above them. As the corn enters the chamber 42, through the openings 39 and the pipe 37, it is generally cold and relatively moist. As heat is driven upwardly from the plenum chambers 66, 67, and 68, it causes drying of the corn. The height of the column of grain in the chamber 42 is predetermined so that the major portion of the heat is utilized. In other words, by the time the heated air has passed through the column of grain it is substantially saturated and approximately at room temperature. The top of the grain drying chamber is open and the air after passing through the column of grain is discharged through the open top. It is obvious that at different levels within the chamber 42, the corn will be at different temperatures. As the corn progresses downwardly, it gets hotter and dryer. The parallelism between the upper surface of the corn and the heat entrances is for the purpose of effecting a uniformed heating of the corn over the entire width of the dryer.

Grain discharge rolls 69 are positioned adjacent the lower portions of each plenum chamber. One of these rolls is shown in greater detail in Figure 4. It will be seen that the periphery of the rolls is provided with intermittent pockets 70 so that at no place around the roll is there a continuous cut-out portion, or is there a continuous cut-out portion from one end of the roll to the other. The pockets 70 are offset both around and longitudinally of the rolls 69. Returning to Figure 3, it will be obvious that the kernels of corn will fill the pockets 70, and upon rotation of the rolls 69 will permit a discharge of the kernels at the point 71 at the bottom of the rolls. The size and number of pockets in the rolls are such that the corn is removed at substantially the same rate at which it is fed to the device whereby the hopper is maintained substantially filled and always presents a uniform column of grain of the desired altitude. Partitions 72 are attached to the sides of the several plenum chambers and, in cooperation with similar partitions 73, provide a trough with an opening in the bottom thereof for feeding directly to the pockets 70 within the rolls 69. Further, the rolls 69 are partially surrounded with a covering material 74, such as canvas, leather, rubber, or possibly synthetic rubbers. These covers 74 are in two sections and are fastened directly or indirectly at 75 and 76 to the partitions 72 and 73, respectively. The lower ends of the covers 74 are equipped with rods 77 and 78 which are yieldably held together by a spring or the like (not shown). The space 71 between the rods 77 and 78 is to permit the discharge of kernels. The covers 76 snugly engage the annular peripheries of the rolls 69 and so prevent to a great degree the passage of hot air from the chamber 42 to a chamber 79 beneath the plenum chambers. Conversely, cold air in the chamber 79 is prevented from passing upwardly into the grain column chamber 42.

At the time the corn kernels are discharged at the spaces 71 beneath the rolls 69, they are very hot and if stored in that condition would tend to take on considerable surface condensation with the result that the corn would be in no better condition for storing than before dehydration. It is, therefore, necessary to provide means for bringing the temperature of the corn down after it has been heated and dried preliminary to storing. The chamber 79 includes a cooling means. The corn from all four of the rolls 69 is dropped on to a cross-conveyer 80 which extends substantially across the width of the grain dryer. This conveyer 80 is preferably of the canvas type and extends around end rolls 81 and 82 which have central shafts 83 and 84, respectively. Slat members 85, preferably of wood, run longitudinally of the entire grain dryer and transversely of the conveyer 80 and are attached to the conveyer 80 at regular intervals therearound. The slats 85 are equipped with outwardly extending nail-like projections 86. These nails extend along the entire surface of each slat, as best shown in Figure 4.

The conveyer 80 is driven in a clockwise direction, as viewed in Figure 3, and all grain discharged by the rolls 69 will be carried around the end 82 and dropped on a corrugated bottom 87. This corrugated bottom 87 is best shown in Figure 4 and includes peaks 88 and depressions 89. The nail-like projections 86 are adapted to project downwardly within the depressions 89, and as the kernels of corn are dropped on to the bottom 87 at the point 90, the kernels are carried substantially individually across this corrugated bottom 87 within the depressions 89. The kernels are discharged at the point 91 closely adjacent a discharge auger 92 so that the grain coming down an inclined surface 93 is fed rearwardly to the point where it joins the grain discharge elevator 57.

The rolls 69 have central shaft 94 journaled in the housing which project rearwardly beyond the housing 11 as shown in the Figure 2 rear view. Each shaft 94 has a sprocket 95 keyed or otherwise fastened thereto.

It is a requirement of this grain dehydrator that the discharge rolls 69 rotate very slowly and to that end a particular drive is employed. The pulley 50' is equipped with a crank pin 96 to which is attached a pitman 97. It will be evident that as the pulley 50' rotates, the pitman 97 will reciprocate vertically. The lower end of the pitman is attached at 98 to an arm 99 which is pivoted on a shaft 100. A ratchet wheel 101 is mounted on this shaft 100 and carries with it a sprocket 102 in a common plane with the sprockets 95. The arm 99 is equipped with a projection 103 to which is pivoted a pawl 104 for engagement with the ratchet wheel 101. As the pitman 97 is lifted upwardly, the pawl 104 engaging the ratchet teeth causes the ratchet wheel 101 to rotate in a clockwise direction as viewed in the device of Figure 2. The effective movement of the pawl 104 may be curtailed by the member 105. This member 105 is in the form of a circular segment and is pivoted on the shaft 100. The vertex 106 of the segment 105 is adjustably positioned within the slotted bracket 107. The outer arcuate end of the segment 105 is adapted to coincide with the arcuate periphery of the ratchet wheel 101. The pawl 104, as shown in Figure 2, is thus prevented from contacting the ratchet teeth and movement of the ratchet wheel 101 is thereby delayed until the pawl 104 passes beyond the upper limit of the segment 105. The segment 105 may be pivoted about its center 100 and fixed in any desired position within the slotted bracket 107 to effect any rate of ratchet rotation that is permissible between the limits of movement of the pitman 97. A second pawl 108 is resiliently held against the bottom of the ratchet wheel 101 by means of a spring 109. This ratchet wheel prevents rearward or counter-clockwise rotation of the ratchet wheel 101 when the pawl 104 no longer is engaged with the ratchet teeth. A chain 110 is wrapped around each of the sprockets 95 as well as the sprocket 102, an idler sprocket 111, and the sprocket 112. The sprocket 112 is mounted on the shaft 84 which is a continuation of the shaft for the roll 82 of the cross-conveyer 80. From this it will be evident that drive from the pulley 50 through the pawl 104 to the ratchet wheel 101 imparts rotation to the rolls 69 as well as the conveyer 80. The idler sprocket 111 is mounted on a stub shaft 113 and merely performs the function of maintaining the chain taut.

As previously stated, the oil burner throws a fuel oil through the tube 30 into a furnace 114 which has a dome-like structure 115 within which combustion takes place. The fan 18, as shown in Figure 4, is adapted to take air in at 116 and supply it with a high velocity so that it is projected downwardly through the opening 117 directly above the dome 115. The air then passes over the furnace dome and down around beneath the chamber 42 as indicated by the arrows. The hot air enters the ends of the plenum chambers 66, 67, and 68 and escapes upwardly through the screen passageways 61, 62, 63, 64, and 65, whereupon it continues its upward movement through the column of corn thus performing the dehydrating action. A portion of the air used for the fan intake 116 is not taken directly from the atmosphere but as best shown in Figure 3 is drawn in through an entrance 118 in the bottom of the housing and passes beneath the corrugated bottom 87 of the cooling chamber 79. The air thus drawn in is within a chamber 119 between the bottom plate 120 and the corrugated partition 87. The kernels of corn are passing individually along the corrugations within the depressions 89, thus transferring heat from the dehydrated corn to the incoming air. This performs two functions: (1) that of cooling the finished corn and (2) that of preheating the incoming air to be used in the dehydrating process. As best shown in Figure 5, after the incoming air has traversed the chamber 119, it enters a substantially triangularly shaped chamber 121 which carries it along the side of the grain dryer housing and thence upwardly through the conduit 122 where it is drawn into the fan 18 by means of the suction created by the fan. From this description, it is seen that the air that is used to directly contact the corn is free from contamination with any exhaust gases inasmuch as the furnace 114 is sealed from the chamber 123 surrounding the furnace.

The exhaust gases formed after combustion of the oil within the furnace 114 pass upwardly through the dome 115 into the conduit 124, then downwardly into the cylindrical conduit 125 which causes the hot exhaust gases to progress circularly and upwardly in the manner indicated by the arrows. It will be obvious that the gases are required to travel through one-half of the cylindrical conduit 125 where it progresses upwardly into a second section 126 of the cylindrical conduit, whereupon it proceeds back around another half revolution and then up to the third and top section 127 of the cylindrical conduit. This is shown in great detail in Figures 4 and 5. This circulation of exhaust gases contributes greatly to the heating of the chamber 123, thus utilizing more of the combustion heat produced by the oil burner 24 or by any type of fuel or furnace that may be employed. The exhaust gases continue travel upwardly as at 128 into a second set of heat transfer conduits which surrounds the fan 18. This also contributes high operating efficiency by the utilization of all heat available. The exhaust gases enter the vertical column 129 and pass through numerous tubes 130 where they congregate in a second vertical column 131 and are discharged into a horizontal tubular member 132. This tubular member 132 is positioned directly beneath the feed pipe 37 and is buried within the column of corn in the chamber 42. Here again the exhaust gases are utilized to their maximum capacities and contribute greatly in preheating the column of corn in the chamber 42. The tubular member 132 is superposed by an outer tubular member 133. The end of the member 133 is secured to the end wall of the grain dryer at 134. As exhaust gases cool, they tend to condense, and it is therefore necessary to provide a drain for such condensation. The bottom of the tubular member 133 is U-shaped as shown at 135. This lower U-shaped portion of the tube 133 tapers downwardly toward the rear of the grain drying machine, and at its end communicates with a drain pipe 136 which projects through the insulated wall 43. The tube 132 terminates at a point short of the end wall, thus permitting the flue gases to come out into the outer tubular member 133 whereupon they are caused to return by contact with the end wall 43 and pass the length of the tube 133, whereupon they are discharged by means of an exhaust fan at 137.

Heat created by the oil burning unit 24 is utilized. The in-take air is preheated. The heated air which emerges from the column of grain from the chamber 42 is substantially room temperature, and the combustion gases pass through numerous heat transfer devices so that the entire grain dehydrator circulation has attained its maximum efficiency.

The grain discharge elevator 57 connects with two discharge spouts 138 and 139. A valve (not shown) can be operated to cause discharging of corn to either of these spouts 138 or 139. The spout 138, however, discharges into the bin 33 which is the supply for the corn to begin its travel through the grain dehydrator. At intervals in the operation of this grain dehydrator, the moisture content of the discharged kernels is tested and, if the content is above some predetermined percentage, then the grain is diverted to the spout 138 where it is again dried. If, however, the moisture content is low enough to have good storing qualities, then the grain is discharged through the spout 139 to some desired storage bin. The testing for moisture may be done in several ways. The subject grain dryer is adapted to employ a mechanical means to test for moisture content and to that end a pulley 140 is fastened to the shaft 56 and by means of a belt 141 acts to cause rotation of the pulley 142 which operates a grain testing device (not shown). An idler pulley 143 maintains tension in the belt 141. The details of the moisture testing device, indicated at 144 and driven by the pulley 142, is shown in greater detail in my co-pending application having Serial No. 528,255 and filed March 27, 1944.

Numerous details of construction may be varied throughout a wide range without departing from the principles disclosed herein. The subject device has been described as a corn dryer when in fact it may be used successfully for drying other smaller grains with but slight changes in the structures.

The intention therefore is only to limit the invention within the scope of the appended claims.

What is claimed is:

1. In a grain dehydrator, a grain chamber, means for moving grain from the top to the bottom of said chamber, a heating compartment, a furnace within said compartment, a fan for blowing air downwardly over said furnace and up through the grain chamber, and means for utilizing exhaust gases from the furnace to preheat the incoming air, said means comprising coils of enclosed conduits positioned around said fan.

2. A grain dryer comprising a grain chamber, a grain feed device at the top of said grain chamber, a grain discharge device at the bottom of said chamber, a heating compartment adjacent said grain chamber, a sealed furnace within said heating compartment, a discharge conduit for exhaust furnace gases, said discharge conduit taking a circuitous path around said heating compartment, and fan means for blowing air downwardly through said heating compartment and up through the grain chamber, a continuation of said discharge conduit circling the fan means.

3. A grain dryer comprising a grain chamber, a grain feed device at the top of said grain chamber, a grain discharge device at the bottom of said chamber, a heating compartment adjacent said grain chamber, a sealed furnace within said heating compartment, a discharge conduit for exhaust furnace gases, said discharge conduit taking a circuitous path around said heating compartment, fan means for blowing air downwardly through said heating compartment and up through the grain chamber, a continuation of said discharge conduit circling the fan means, and a conduit extending longitudinally through the grain chamber near the top thereof, said conduit joining with the discharge conduit for exhaust furnace gases whereby complete utilization of furnace heat is accomplished.

4. In a grain dryer, a grain chamber, means for maintaining said grain chamber constantly filled, said means comprising a means for feeding grain at the top of said chamber and means for removing grain from the bottom of the chamber, said last named means comprising an endless belt conveyer beneath said grain chamber adapted to carry the grain to its discharge end, a corrugated partition beneath and projecting beyond the discharge end of said conveyer and adapted to receive the grain from the conveyer, projections on said belt conveyer on its under side adapted to run through said corrugations whereby the grain deposited on the corrugated partition is carried in the opposite direction by said projections through said corrugations, a bottom beneath and spaced apart from said corrugated partition, and means for drawing air through the space between the corrugated partition and the bottom for preheating the air preliminary to its circulation through the grain chamber, and simultaneously cooling the grain in its travel through the corrugations.

5. In a grain dryer, a grain chamber, means for feeding grain at the top of said chamber and means for discharging grain from the bottom of the chamber, an endless band conveyer beneath said grain chamber discharge means, said endless band conveyer adapted to carry the grain to one side of the grain chamber, a corrugated shelf spaced beneath said conveyer and adapted to receive grain from said endless band conveyer, on the return of the endless band on its under side, projections on said endless band conveyer adapted to run through said corrugations whereby the grain is carried in the opposite direction by said projections over said corrugations, air-circulating means for said grain chamber, a bottom beneath and spaced apart from said corrugated shelf, and means for drawing air through the space between the corrugated shelf and the bottom for preheating air for the air circulating means and simultaneously cooling the grain in its discharge over the corrugated shelf.

6. A grain dryer comprising a grain chamber, means for feeding grain to the top of said chamber and means for removing grain from the bottom of said chamber, a furnace adjacent said grain chamber, a discharge conduit for furnace combustion gases extending longitudinally of said grain chamber immediately beneath the top thereof, a superposed return conduit for said longitudinally extending discharge conduit, and means for exhausting the combustion gases.

7. A grain dryer comprising a grain chamber, means for feeding grain to the top of said chamber and means for removing grain from the bottom of said chamber, a furnace adjacent said grain chamber, a discharge conduit for furnace combustion gases extending longitudinally of said grain chamber immediately beneath the top thereof, a superposed return conduit for said longitudinally extending discharge conduit, means for exhausting the combustion gases, and a condensate drain for said superposed return conduit.

ALBERT B. WELTY.